(12) United States Patent
Buchs et al.

(10) Patent No.: US 6,469,976 B1
(45) Date of Patent: Oct. 22, 2002

(54) PLAYBACK APPARATUS FOR A STORAGE DISC

(75) Inventors: Willy Buchs, Lonay; Pierre Jeannin, Morges, both of (CH)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/673,064

(22) PCT Filed: Apr. 6, 1999

(86) PCT No.: PCT/DE99/01032

§ 371 (c)(1),
(2), (4) Date: Jan. 4, 2001

(87) PCT Pub. No.: WO99/52108

PCT Pub. Date: Oct. 14, 1999

(30) Foreign Application Priority Data

Apr. 7, 1998 (DE) ......................................... 198 15 492

(51) Int. Cl.$^7$ .............................................. G11B 25/00
(52) U.S. Cl. ........................................................ 369/263
(58) Field of Search .................................. 369/258, 261, 369/263, 53.13, 53.18, 53.42, 270, 271, 53.12

(56) References Cited

U.S. PATENT DOCUMENTS

| | | |
|---|---|---|
| 4,641,152 A | 2/1987 | Fedder et al. |
| 5,610,900 A | 3/1997 | Yamashita et al. |

FOREIGN PATENT DOCUMENTS

| | | |
|---|---|---|
| DE | 1 96 42 343 | 4/1998 |
| EP | 0 287 101 | 10/1988 |
| EP | 0 287 153 | 10/1988 |
| EP | 0 632 441 | 1/1995 |
| FR | 2 534 405 | 4/1984 |

*Primary Examiner*—Paul W. Huber
(74) *Attorney, Agent, or Firm*—Kenyon & Kenyon

(57) ABSTRACT

A playback apparatus for a storage disc permits improved damping of vibration of the storage disc normal to the plane of the disc. The playback apparatus includes a first disc and a second disc, where the storage disc can be positioned between the first disc and the second disc. A predetermined distance is provided between the storage disc and the first disc within a predetermined area. The area and the distance are selected so that when there is vibration of the playback at apparatus approximately normal to the plane of the disc with an acceleration not exceeding a predetermined value, there results an amplitude of a resulting vibration of an outside edge of the storage disc in relation to a mid point of the storage disc which is below a predetermined value.

15 Claims, 2 Drawing Sheets

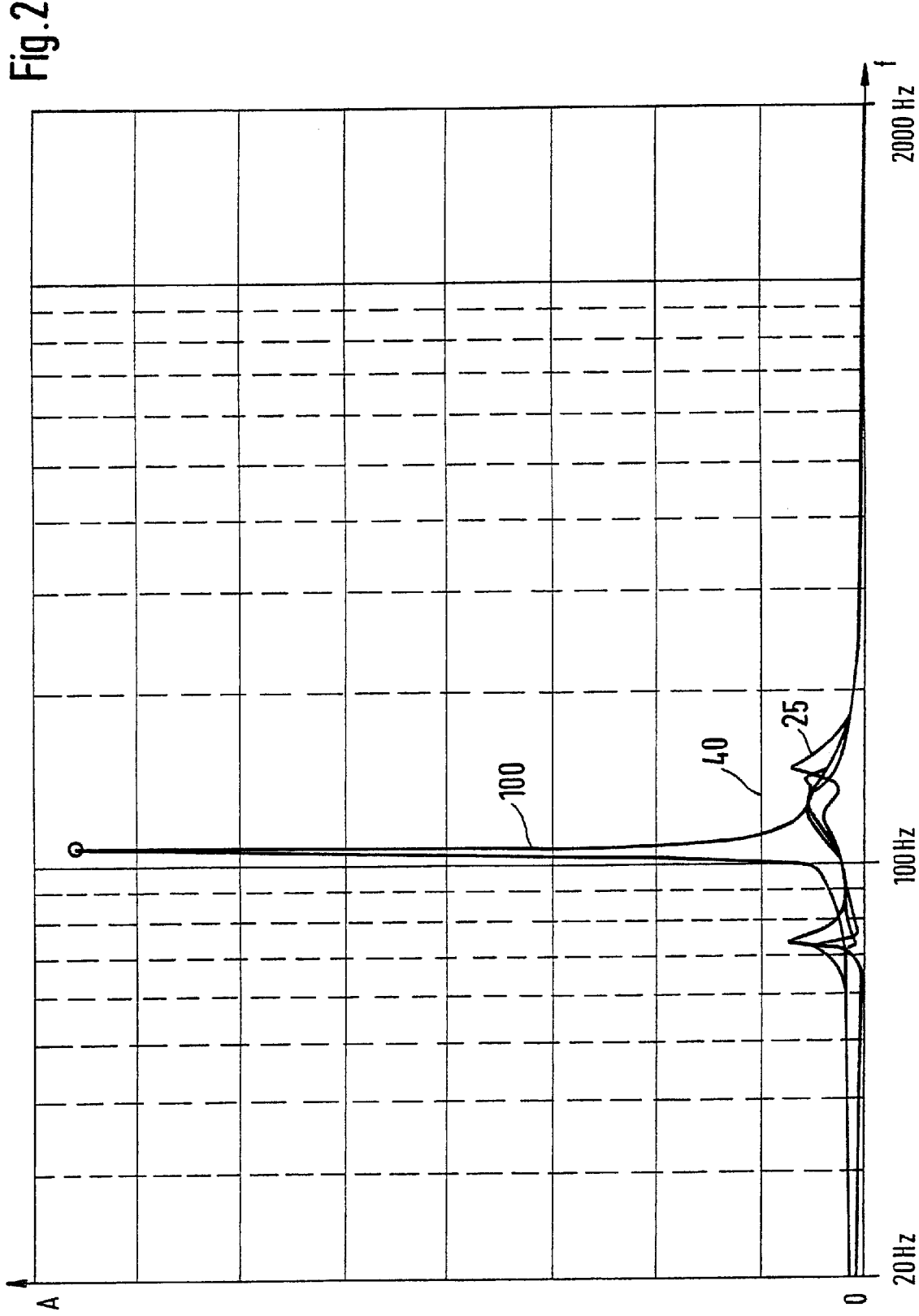

PLAYBACK APPARATUS FOR A STORAGE DISC

BACKGROUND INFORMATION

German Patent Application No. 1 96 42 343 has already describes a playback apparatus wherein a compact disc motor with an axle drives a recording carrier in the form of a compact disc secured between a first disc connected to the axle and a second disc.

ADVANTAGES OF THE INVENTION

SUMMARY OF THE INVENTION

The playback apparatus according to the present invention, has the advantage that a predetermined distance is provided between the storage disc and the first disc within a predetermined area, and the area and the distance are selected so that when there is vibration of the playback apparatus approximately normal to the plane of the disc with an acceleration not exceeding a predetermined value, there results an amplitude of a resulting vibration of an outside edge of the storage disc in relation to a mid point of the storage disc which is below a predetermined value. In this way, vibration of the storage disc can be dampened without requiring additional damping means due to the air layer between the storage disc and the first disc in the predetermined area and due to the change in volume between the storage disc and the first disc in the predetermined area, especially at the resonant frequency of the storage disc. Thus, when there is any vibration of the storage disc, the air layer between the storage disc and the first disc in the predetermined area and the change in volume between the storage disc and the first disc in the predetermined area function as damping means.

Another advantage is that when the storage disc experiences vibrations normal to the plane of the disc, position errors in focusing the tracks of an optical storage disc by means of a beam of light of a reading device for sampling the information stored in the tracks can be suppressed to a great extent, thus making the reading device highly resistant to vibration of the playback apparatus perpendicular to the plane of the disc. This is especially advantageous with a playback apparatus designed as a compact disc player where a disc drive is suspended without any additional damping means.

Another advantage is that the inertial forces transmitted to the housing of the playback apparatus with vibration of the playback apparatus are greatly reduced due to the damping of vibrations of the storage disc normal to the plane of the disc.

Another advantage is that the positioning force required to position the storage disc between the first and second discs, serving to position the storage disc on the second disc is reduced due to the damping of vibrations of the storage disc normal to the plane of the disc.

Due to the damping of the vibrations of the storage disc normal to the plane of the disc, the storage disc can thus be positioned with a lower positioning force with at the same time a reduction in its sensitivity to vibrations of the playback apparatus. When the second disc and with it the storage disc and the first disc are rotated by a motor-driven axle in operation for output of data, the motor and its bearings are less burdened by the positioning force for positioning the storage disc between the first disc and the second disc, thus lengthening its lifetime and maintaining the quality of the output for a long time.

It is especially advantageous that an essentially inelastic and porous material is arranged between the storage disc and the first disc in at least part of the predetermined area. This prevents scratching of a protective layer covering a metallized surface, for example, of the storage disc due to the storage disc repeatedly striking the first disc when the storage disc vibrates normal to the plane of the disc. Damping of the vibrations of the storage disc normal to the plane of the disc is possible due to the pores in the material, permitting a layer of air between the storage disc and the first disc. Damping of vibrations of the storage disc normal to the plane of the disc is further improved by using an inelastic material.

BRIEF DESCRIPTION OF THE DRAWINGS

FIG. 2 shows a plot of vibration amplitude over frequency.

DETAILED DESCRIPTION

Figure 1:
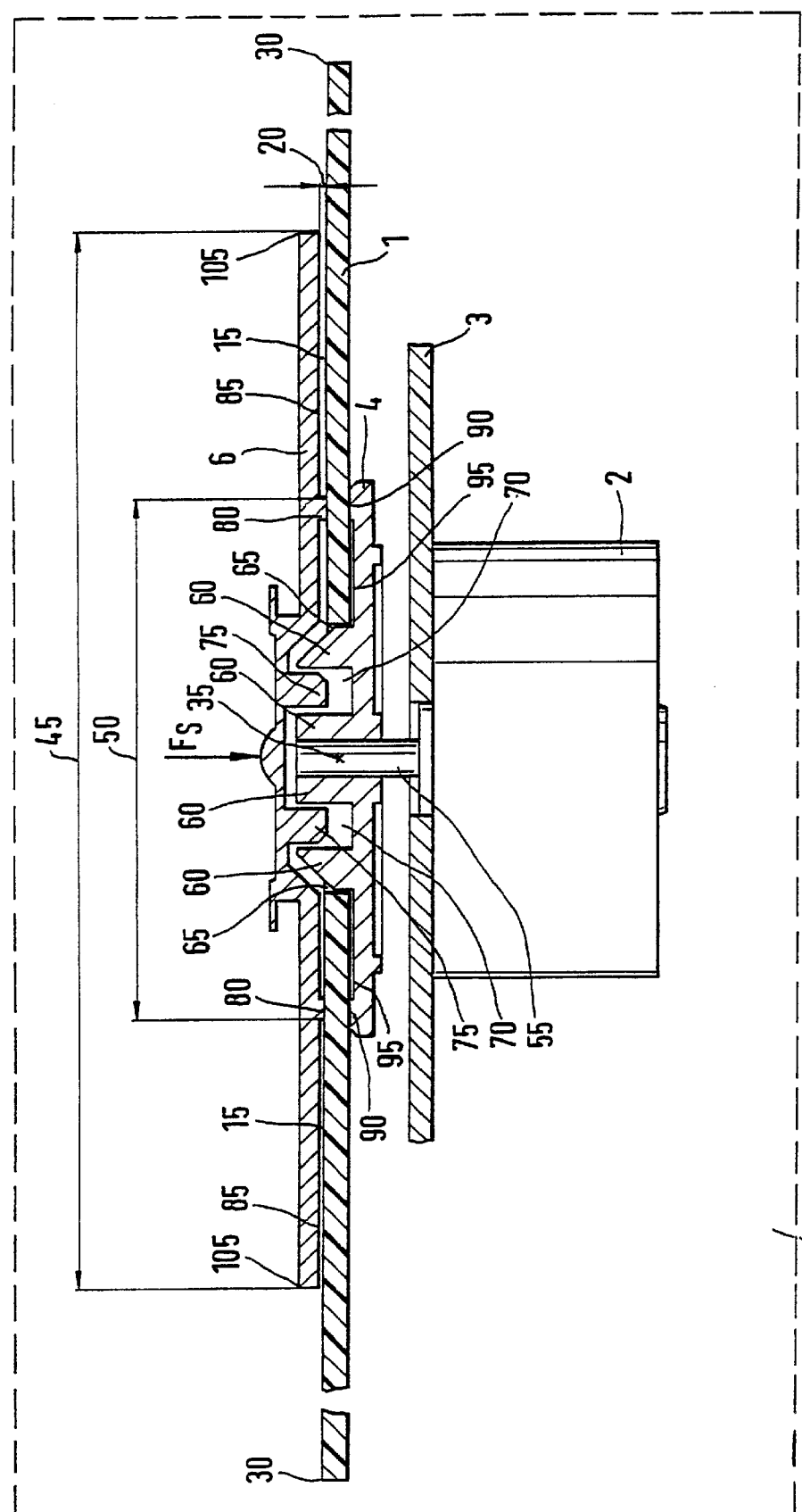
FIG. 1 shows a side view of a playback apparatus according to the present invention.

FIG. 1 shows a playback apparatus 10 for storage discs 1. Storage discs 1 may include, for example, optical, magnetic, opto-magnetic storage discs 1 or the like. This embodiment concerns a playback apparatus 10 for playback of an optical storage disc 1, e.g., a compact disc, a digital video disc or the like. Playback apparatus 10 may be a compact disc player, a video disc player or the like.

Playback apparatus 10 includes a drive motor 2 mounted on a plate 3 of a base carrier. Motor 2 drives an axle 55. A second circular disc 4 is mounted on axle 55 and has a ring-shaped projection 60 concentric with second disc 4, engaging in a circular passage 65 in storage disc 1. Storage disc 1 is also circular, with a mid point 35 of storage disc 1 also being the mid point of passage 65. Storage disc 1 sits on second disc 4 so that it is concentric with second disc 4 and is centered by projection 60. Projection 60 has a ring-shaped recess 70 which is also concentric with second disc 4. A first ring-shaped elevation 75 of a first disc 6, which is also concentric with second disc 4, engages in ring-shaped recess 70. First disc 6 is also circular. Through a lever system (not shown in FIG. a positioning force $F_S$ approximately perpendicular to the plane of the disc is exerted approximately at the center of first disc 6, so that storage disc 1 is positioned by positioning force $F_S$ between first disc 6 and second disc 4. First disc 6 is centered by the engagement of first elevation 75 in recess 70 and is secured on second disc 4. First disc 6 has a second ring-shaped elevation 80 on a surface 85 facing storage disc 1. Second ring-shaped elevation 80 of first disc 6 is concentric with first ring-shaped elevation 75 of first disc 6. Second ring-shaped elevation 80 of first disc 6, however, has a larger radius than first ring-shaped elevation 75 of first disc 6. Thus, second ring-shaped elevation 80 of first disc 6 rests on storage disc 1.

Second disc 4 includes on a surface 95 facing storage disc 1 a ring-shaped elevation 90 concentric with projection 60 and having a larger radius than projection 60. Storage disc 1 thus rests on elevation 90 of second disc 4. The radius of second elevation 80 of first disc 6 is approximately the same as the radius of elevation 90 of second disc 4, so positioning force $F_S$ is distributed on second disc 4 along a circle concentric with second disc 4. However, there are also playback apparatuses where positioning force $F_S$ acts in the opposite direction on first disc 6 and is distributed there on a circle or among three points each spaced 120 degrees apart.

Positioning force $F_S$ is between 1N and 2N, for example.

In addition, an optical reading head and a mechanism for guidance and transport of the reading head are arranged on plate 3 of the base carrier, although these are not shown in FIG. 1. By using a beam of light focused on tracks on storage disc 1, the reading head scans information recorded in the tracks. Therefore, storage disc 1 is rotated by drive motor 2 via axle 55.

The diameter of second disc 4 is approximately 30 mm in this embodiment, corresponding approximately to the diameter of ring-shaped elevation 90 of second disc 4.

If playback apparatus 10 is installed in a vehicle, storage discs 1 inserted into playback apparatus 10 behave like a vibrating body when playback apparatus 10, which may be integrated into a car radio, for example, experiences vibrations according to an acceleration spectrum transmitted to its housing. Any axial play in the area of axle 55 arranged at the common mid point of the two discs 4, 6 and storage disc 1 is suppressed by positioning force $F_S$ acting centrally on first disc 6. This yields symmetrical deformation of storage disc 1 with respect to axle 55 when vibration acts on playback apparatus 10 in the axial direction, i.e., approximately normal to the plane of the two discs 4, 6 and storage disc 1, resulting in a relative motion of an outside edge 30 of storage disc 1 with respect to mid point 35 of storage disc 1. The amplitude of this motion depends on the frequency and amplitude of acceleration of drive motor 2, the material and the dimensions of storage disc 1 itself and the positioning system used for centered positioning of storage disc 1 between first disc 6 and second disc 4. Acceleration of drive motor 2 occurs due to vibrations of playback apparatus 10 in the vehicle. The amplitude of the relative motion of storage disc 1 described here is at a maximum when drive motor 2 experiences acceleration at a frequency corresponding to the natural frequency of storage disc 1 and the positioning system. Storage disc 1 is then excited at its resonant frequency and the relative motion of storage disc 1 assumes very large amplitudes if damping of storage disc 1 and its installation is slight. To maintain the set distance between a lens of the optical reading head and storage disc 1 with the required accuracy (currently approximately ±2 μm) for error-free readout of the tracks of storage disc 1, the lens of the optical reading head is controlled by a position controller and thus it follows the movements of storage disc 1.

The inventors have found that with a typical acceleration spectrum which is obtained due to vibrations of playback apparatus 10 approximately normal to the plane of the two discs 4, 6 and storage disc 1, the main cause of a position error in controlling the focusing of the light beam of the optical reading head on a track of storage disc 1 is the relative motion of storage disc 1 at its resonant frequency. It has been found that the maximum allowed acceleration at which there is no disturbance in the scanning of the tracks of storage disc 1 is lowest at the resonant frequency of storage disc 1.

An outside diameter 50 of second ring-shaped elevation 80 of first disc 6 corresponds approximately to the diameter of second disc 4, where ring-shaped elevation 90 of second disc 4 runs on an outside edge of second disc 4. A total diameter 45 of first disc 6 is larger than outside diameter 50 of second ring-shaped elevation 80 of first disc 6 and is less than or equal to a total diameter of storage disc 1.

Between outside diameter 50 of second ring-shaped elevation 80 of first disc 6 and total diameter 45 of first disc 6, a distance 20 is provided between first disc 6 and storage disc 1. This forms an annular disc-shaped area 15 between outside diameter 50 of second ring-shaped elevation 80 of first disc 6 and total diameter 45 of first disc 6 that is arranged concentric with second disc 4. Distance 20 may be a few tenths of a millimeter, for example. The air present in annular disc-shaped area 15 forms an air layer which dampens vibration of storage disc 1 approximately normal to the plane of the disc, especially at the resonant frequency of storage disc 1. An essentially inelastic and porous material may be arranged in part of annular disc-shaped area 15 or in the entire annular disc-shaped area 15. This may be a textile layer or a felt layer which also contains air because of the pores and thus contributes toward the damping of vibrations of storage disc 1 as described above. This damping is further improved by the inelasticity of the material. These vibrations of storage disc 1 approximately normal to the plane of the disc are dampened because of the air layer in annular disc-shaped area 15 and the change in volume of annular disc-shaped area 15 which occurs with vibration of storage disc 1 approximately normal to the plane of the disc. Differences in damping can be established by varying the dimensions of annular disc-shaped area 15. The dimensions of annular disc-shaped area 15 can be altered, for example, by varying total diameter 45 of first disc 6 and/or distance 20 between first disc 6 and storage disc 1 while maintaining the same outside diameter 50 of second ring-shaped elevation 80 of first disc 6. It was found in experiments in this regard that adequate damping of the vibrations of storage disc 1 is achieved when total diameter 45 of first disc 6 is greater than 50 mm.

FIG. 2 shows a curve for amplitude A of relative motion of storage disc 1 between its mid point 35 and its outside edge 30 as a function of frequency f. To determine the frequency response characteristic of this amplitude, drive motor 2 is subjected to a sinusoidal movement approximately normal to the plane of storage disc 1, its frequency being varied between 20 Hz and 2000 Hz. An acceleration $\ddot{z}_2$ occurring with this movement was set to be constant. To determine the frequency response characteristic of amplitude A according to FIG. 2, an acceleration of $\ddot{z}_2 = 4$ m/s² was selected. In this movement, storage disc 1 is deformed approximately normal to the plane of the disc, with the resulting relative motion between outside edge 30 of storage disc 1 and a circular ring of storage disc 1 in the area of second ring-shaped elevation 80 of first disc 6 being measured as representative of mid point 35. Amplitude A of this relative motion is plotted as a function of frequency f in FIG. 2, standardized to a constant acceleration $\ddot{z}_2$. It is characterized here by reference number 25 and is below a predetermined amplitude value 40 over the entire frequency range in question. A value of 60 mm was selected as total diameter 45 of first disc 6, 30 mm for outside diameter 50 of second ring-shaped elevation 80 of first disc 6 and a value of 0.1 mm was selected for distance 20 between first disc 6 and storage disc 1. For these measurements, a Philips test disc SBC 444 was used as storage disc 1. A positioning force $F_S$ of 2N was set. A value of 40 μm was obtained for the relative motion as the maximum amplitude of vibration.

The same measurements were also conducted with a first disc 6 whose total diameter 45 corresponds approximately to outside diameter 50 of second ring-shaped elevation 80 of first disc 6, so that there is no damping annular disc-shaped area 15. An amplitude labeled as 100 in FIG. 2 is obtained for the relative motion between outside edge 30 of storage disc 1 and the circular ring of storage disc 1, which is in the area of second ring-shaped elevation 80 of first disc 6, where this amplitude 100 reaches a maximum value of 487 μm at the resonant frequency of storage disc 1 of 106.8 Hz. With other storage discs, amplitudes of the same order of magnitude were obtained for resonant frequency values between 85 Hz and 115 Hz. This yields a reduction in amplitude of relative motion by a factor of approximately 12 when using annular disc-shaped area 15 with dimensions of 60 mm for total diameter 45 of first disc 6 and 0.1 mm for distance 20 between first disc 6 and storage disc 1 as described above. The value 40 given for amplitude A in FIG. 2 by way of an example, which should be the upper limit for the amplitude of the relative motion and should be higher than the amplitude of the relative motion, corresponds to approximately 70 $\mu$m.

At a total diameter 45 of first disc 6 of 60 mm and twice distance 20 between first disc 6 and storage disc 1 of 0.2 mm, there is a maximum amplitude for the relative motion which has a reduction by a factor of only 2.5 in comparison with the maximum of amplitude 100 for the arrangement described here without annular disc-shaped area 15 which has a damping effect, and this results in exceeding the predetermined amplitude value 40.

Through appropriate dimensioning of annular disc-shaped area 15 by means of the choice of total diameter 45 of first disc 6, outside diameter 50 of second ring-shaped elevation 80 of first disc 6 and distance 20 between first disc 6 and storage disc 1, damping by the air layer in this annular disc-shaped area 15 can be adjusted so that with vibrations of playback apparatus 10 approximately normal to the plane of discs 4, 6 and storage disc 1 with an acceleration not exceeding a predetermined value, the amplitude of the resulting vibration of outside edge 30 of storage disc 1 in relation to mid point 35 or to a circular ring of storage disc 1 in the area of second elevation 80 of first disc 6 or another point or area of storage disc 1, preferably near its mid point 35, is below a predetermined value.

To implement annular disc-shaped area 15, it is necessary for total diameter 45 of first disc 6 to exceed a predetermined value which amounts to 30 mm in the embodiment described here and to correspond to outside diameter 50 of second ring-shaped elevation 80 of first disc 6. In this way, the inside diameter of annular disc-shaped area 15 also exceeds outside diameter 50 of second ring-shaped elevation 80 of first disc 6 as a predetermined value.

Distance 20 between first disc 6 and storage disc 1 in annular disc-shaped area 15 can also be set at 0 mm, where a variable volume with an air layer between first disc 6 and storage disc 1 is nevertheless established with such a distance 20 with the vibration of storage disc 1 approximately normal to the plane of storage disc 1, this variable volume functioning as a damping means. With otherwise the same parameters, this yields a damping of the amplitude of the relative motion, which is of the same order of magnitude as when distance 20 is set at 0.1 mm.

When storage disc 1 has a planar surface, distance 20 remains approximately constant in the entire annular disc-shaped area 15 and storage disc 1 does not come in contact with first disc 6 there. In fact, storage disc 1 is deformed in an edge area 105 of first disc 6 by only a few $\mu$m, because the deformation increases toward the outer edge of the disc with the fourth power of the radius, and is thus 16 times smaller at edge area 105, approximately 30 mm away from mid point 35 of storage disc 1, than at outside edge 30 of storage disc 1 when the total diameter of storage disc 1 is approximately twice as large as total diameter 45 of first disc 6.

In measurements on test storage disc Abex TCD 731 A having an axial eccentricity of 1 mm, a maximum amplitude of the relative motion which is lower by a factor of 8, according to amplitude 100 in FIG. 2, in comparison with the maximum amplitude with an arrangement without annular disc-shaped area 15 was obtained when distance 20 was selected to be 0.1 mm with otherwise the same parameters.

To nevertheless prevent the possible risk of scratching of a protective layer covering a metallized surface of storage disc 1, an essentially inelastic and porous material, e.g., in the form of a thin felt, may be glued beneath first disc 6 in at least part of annular disc-shaped area 15. This material may also cover the entire surface 85 of first disc 6 facing storage disc 1 within annular disc-shaped area 15. However, it is also possible for the material to be glued to surface 85 of first disc 6 facing storage disc 1 in only part of annular disc-shaped area 15. This part may also be ring-shaped and concentric with second disc 4. Thus, for example, a ring-shaped felt material with an inside diameter of 57 mm and an outside diameter of 60 mm corresponding to total diameter 45 of first disc 6 may be glued to surface 85 of first disc 6 facing storage disc 1 so that it is concentric with second disc 4. The thickness of the material may be selected so that it also comes in contact with the surface of storage disc 1 facing first disc 6. When using an essentially inelastic and porous material at least in part of annular disc-shaped area 15, the damping of the amplitude of the relative motion of storage disc 1 is of the same order of magnitude as without the use of such a material in annular disc-shaped area 15, where the damping of the vibrations of this relative motion and even with the use of the essentially inelastic and porous material in annular disc-shaped area 15 is caused by the change in volume between first disc 6 and storage disc 1 and the air layer between the material and the surface of storage disc 1 facing first disc 6 and the air layer present in the material itself.

Instead of felt, a textile material having essentially the same effect may also be used. When using a distance 20 between 10 $\mu$m and 200 $\mu$m, comparatively high damping values can be achieved for the relative motion without using a material in annular disc-shaped area 15. When using the essentially inelastic and porous material at least in part of annular disc-shaped area 15, comparatively high damping values are obtained for the relative motion when distance 20 is selected to be between 200 $\mu$m and 1000 $\mu$m. The material glued to surface 85 of first disc 6 facing storage disc 1 may but need not come in contact with the surface of storage disc 1 facing first disc 6.

What is claimed is:

1. A playback apparatus for a storage disc having a first disc and a second disc, the storage disc being positionable between the first disc and the second disc, comprising:
    an arrangement providing a predetermined distance between the storage disc and the first disc within a predetermined area, the predetermined area and the predetermined distance being such that, when there is a vibration of the playback apparatus substantially normal to a plane of the storage disc with an acceleration not exceeding a first predetermined value, there results an amplitude of a resulting vibration of an outside edge of the storage disc in relation to a mid point of the storage disc which is below a second predetermined value.

2. A playback apparatus for a storage disc having a first disc and a second disc, the storage disc being positionable between the first disc and the second disc, comprising:
    an arrangement providing a predetermined distance between the storage disc and the first disc within a predetermined area, the predetermined area and the predetermined distance being such that, when there is a vibration of the playback apparatus substantially normal to a plane of the storage disc with an acceleration not exceeding a first predetermined value, there results an amplitude of a resulting vibration of an outside edge of the storage disc in relation to a mid point of the storage disc which is below a second predetermined value;

wherein a total diameter of the first disc is less than a total diameter of the storage disc.

3. The playback apparatus according to claim 2, wherein the first disc and the second disc are each circular, and a diameter of the first disc exceeds a third predetermined value.

4. The playback apparatus according to claim 3, wherein the predetermined area is ring shaped and an inside diameter of the predetermined area exceeds the third predetermined value.

5. The playback apparatus according to claim 2, wherein the predetermined distance is between about 10 $\mu$m and about 200 $\mu$m.

6. The playback apparatus according to claim 2, wherein the predetermined distance is about 0 millimeters.

7. The playback apparatus according to claim 2, wherein the total diameter of the first disc is greater than about 50 millimeters.

8. The playback apparatus according to claim 7, wherein:

the total diameter of the first disc is about 60 millimeters; and the predetermined distance is about 0.1 millimeters.

9. The playback apparatus according to claim 7, wherein:

the total diameter of the first disc is about 60 millimeters; and the total diameter of the storage disc is about twice as large as the total diameter of the first disc.

10. The playback apparatus according to claim 3, wherein:

the third predetermined value corresponds to an outside diameter of a ring-shaped elevation of the first disc; and the third predetermined value exceeds about 30 millimeters.

11. A playback apparatus for a storage disc having a first disc and a second disc, the storage disc being positionable between the first disc and the second disc, comprising:

an arrangement providing a predetermined distance between the storage disc and the first disc within a predetermined area, the predetermined area and the predetermined distance being such that, when there is a vibration of the playback apparatus substantially normal to a plane of the storage disc with an acceleration not exceeding a first predetermined value, there results an amplitude of a resulting vibration of an outside edge of the storage disc in relation to a mid point of the storage disc which is below a second predetermined value; and a substantially inelastic porous material situated between the storage disc and the first disc in at least part of the predetermined area.

12. The playback apparatus according to claim 11, wherein the material includes a felt.

13. The playback apparatus according to claim 11, wherein the material includes a textile.

14. The playback apparatus according to claim 11, wherein the predetermined distance is between about 200 $\mu$m and about 1000 $\mu$m.

15. The playback apparatus according to claim 12, wherein:

the total diameter of the first disc is about 60 millimeters; and the material includes a ring-shaped felt with an inside diameter of about 57 millimeters and an outside diameter of about 60 millimeters glued to a surface of the first disc facing the storage disc, the ring-shaped felt substantially concentric with the second disc.

\* \* \* \* \*

UNITED STATES PATENT AND TRADEMARK OFFICE
CERTIFICATE OF CORRECTION

PATENT NO. : 6,469,976 B1 Page 1 of 1
DATED : October 22, 2002
INVENTOR(S) : Buchs et al.

It is certified that error appears in the above-identified patent and that said Letters Patent is hereby corrected as shown below:

Column 1,
Line 6, delete "has already".
Line 12, delete "ADVANTAGES OF THE INVENTION".
Line 16, change "invention, has" to -- invention has --.

Signed and Sealed this

Fourteenth Day of October, 2003

JAMES E. ROGAN
*Director of the United States Patent and Trademark Office*